United States Patent
Rong et al.

(10) Patent No.: US 12,554,584 B2
(45) Date of Patent: Feb. 17, 2026

(54) BOOT DATA READING SYSTEM, BOOT DATA READING METHOD, AND PROCESSOR CIRCUIT

(71) Applicant: Realtek Semiconductor Corporation, Hsinchu (TW)

(72) Inventors: Kui Rong, Hunan Province (CN); Hua Zeng, Hunan Province (CN); Mingrui Li, Hunan Province (CN)

(73) Assignee: Realtek Semiconductor Corporation, Hsinchu (TW)

( * ) Notice: Subject to any disclaimer, the term of this patent is extended or adjusted under 35 U.S.C. 154(b) by 64 days.

(21) Appl. No.: 18/314,128

(22) Filed: May 8, 2023

(65) Prior Publication Data

US 2023/0409428 A1 Dec. 21, 2023

(30) Foreign Application Priority Data

Jun. 14, 2022 (CN) .......................... 202210671779.4

(51) Int. Cl.
*G06F 9/44* (2018.01)
*G06F 9/4401* (2018.01)
*G06F 11/14* (2006.01)

(52) U.S. Cl.
CPC ........ *G06F 11/1417* (2013.01); *G06F 9/4401* (2013.01); *G06F 2201/86* (2013.01)

(58) Field of Classification Search
CPC .................. G06F 1/32; G06F 1/22; G06F 9/44
See application file for complete search history.

(56) References Cited

U.S. PATENT DOCUMENTS

| | | | | |
|---|---|---|---|---|
| 9,804,965 B2 * | 10/2017 | Kim | ...................... | G06F 9/4401 |
| 2005/0246565 A1 * | 11/2005 | Koarai | .................. | G06F 9/4418 |
| | | | | 713/323 |
| 2009/0287918 A1 * | 11/2009 | Goldstein | ............. | G06F 9/4405 |
| | | | | 713/2 |
| 2015/0074461 A1 * | 3/2015 | Yu | ......................... | G06F 9/4406 |
| | | | | 714/36 |
| 2015/0280749 A1 | 10/2015 | Gjorup | | |
| 2020/0278871 A1 * | 9/2020 | Jin | ......................... | G06F 9/4406 |

FOREIGN PATENT DOCUMENTS

| | | |
|---|---|---|
| CN | 112540799 A | 3/2021 |
| TW | 200941217 A | 10/2009 |

* cited by examiner

*Primary Examiner* — Keshab R Pandey
(74) *Attorney, Agent, or Firm* — CKC & Partners Co., LLC (57) ABSTRACT

A boot data reading system includes a storage circuit and a processor circuit. The storage circuit is configured to store first boot data and second boot data. The first boot data includes a first segment and a second segment. The second boot data includes a third segment, and the third segment corresponds to the first segment. The processor circuit is coupled to the storage circuit. The processor circuit reads the first segment and determines whether the first segment is correct or not. When the first segment is correct, the processor circuit reads the second segment and determines whether the second segment is correct or not. When the first segment is incorrect, the processor circuit reads the third segment and determines whether the third segment is correct or not.

16 Claims, 8 Drawing Sheets

BOOT DATA READING SYSTEM, BOOT DATA READING METHOD, AND PROCESSOR CIRCUIT

RELATED APPLICATIONS

This application claims priority to Chinese Application Serial Number 202210671779.4, filed Jun. 14, 2022, which is herein incorporated by reference.

BACKGROUND

Technical Field

The present disclosure relates to a boot technology. More particularly, the present disclosure relates to a boot data reading system, a boot data reading method, and a processor circuit.

Description of Related Art

In some related technologies, boot data are backed up in a storage circuit. In this manner, the system can utilize the boot data to execute the boot procedure. However, some storage circuits are prone to have bit-flip problems. When a bit flip occurs, the boot data in the storage circuit will be incorrect, so that the boot procedure cannot be executed normally.

SUMMARY

Some embodiments of the present disclosure provide a boot data reading system. The boot data reading system includes a storage circuit and a processor circuit. The storage circuit is configured to store first boot data and second boot data. The first boot data includes a first segment and a second segment. The second boot data includes a third segment, and the third segment corresponds to the first segment. The processor circuit is coupled to the storage circuit. The processor circuit reads the first segment and determines whether the first segment is correct or not. When the first segment is correct, the processor circuit reads the second segment and determines whether the second segment is correct or not. When the first segment is incorrect, the processor circuit reads the third segment and determines whether the third segment is correct or not.

Some embodiments of the present disclosure provide a boot data reading method. The boot data reading method includes the following operations: reading, by a processor circuit, a first segment of first boot data and determining whether the first segment is correct or not; reading, by the processor circuit, a second segment of the first boot data and determining whether the second segment is correct or not when the first segment is correct; and reading, by the processor circuit, a third segment of second boot data and determining whether the third segment is correct or not when the first segment is incorrect. The third segment corresponds to the first segment.

Some embodiments of the present disclosure provide a processor circuit. The processor circuit is coupled to a storage circuit. The storage circuit is configured to store first boot data and second boot data. The first boot data includes a first segment and a second segment. The second boot data includes a third segment. The third segment corresponds to the first segment. The processor circuit is configured to: read the first segment and determine whether the first segment is correct or not; read the second segment and determine whether the second segment is correct or not when the first segment is correct; and read the third segment and determine whether the third segment is correct or not when the first segment is incorrect.

As described above, the boot data reading system and boot data reading method according to the present disclosure can read the correct boot data so that the subsequent boot procedure can be successfully executed. In addition, the present disclosure has the advantages of smaller area, lower cost, and no need to occupy a large memory space.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
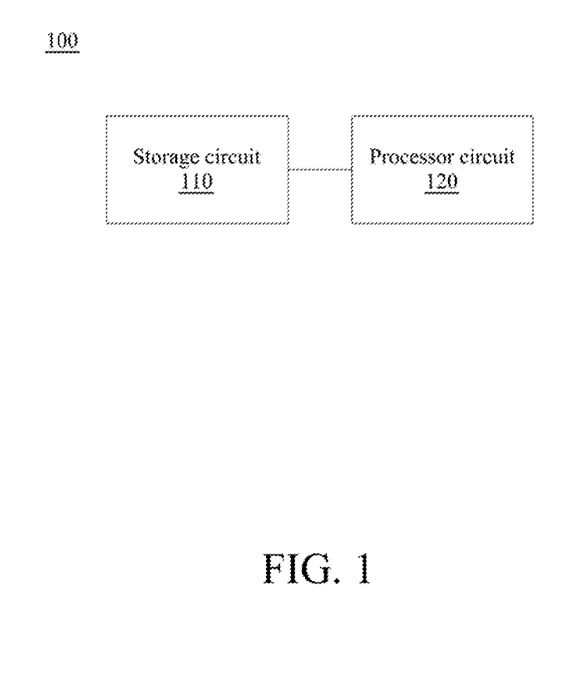
FIG. 1 depicts a schematic diagram of a boot data reading system according to some embodiments of the present disclosure.

A description is provided with reference to FIG. 1. FIG. 1 depicts a schematic diagram of a boot data reading system 100 according to some embodiments of the present disclosure. Take FIG. 1 for example, the boot data reading system 100 includes a storage circuit 110 and a processor circuit 120. The processor circuit 120 is coupled to the storage circuit 110.

In some embodiments, the storage circuit 110 is implemented by using a flash memory, but the present disclosure is not limited thereto. For example, the storage circuit 110 can be implemented by using a NAND flash memory. In some embodiments, the processor circuit 120 is implemented by using a central processor or some other circuit having a data processing function. For example, the processor circuit 120 can read codes in a non-transitory computer readable recording medium to perform corresponding operations (e.g., operations in FIG. 6, FIG. 7 and FIG. 8).

Figure 2:
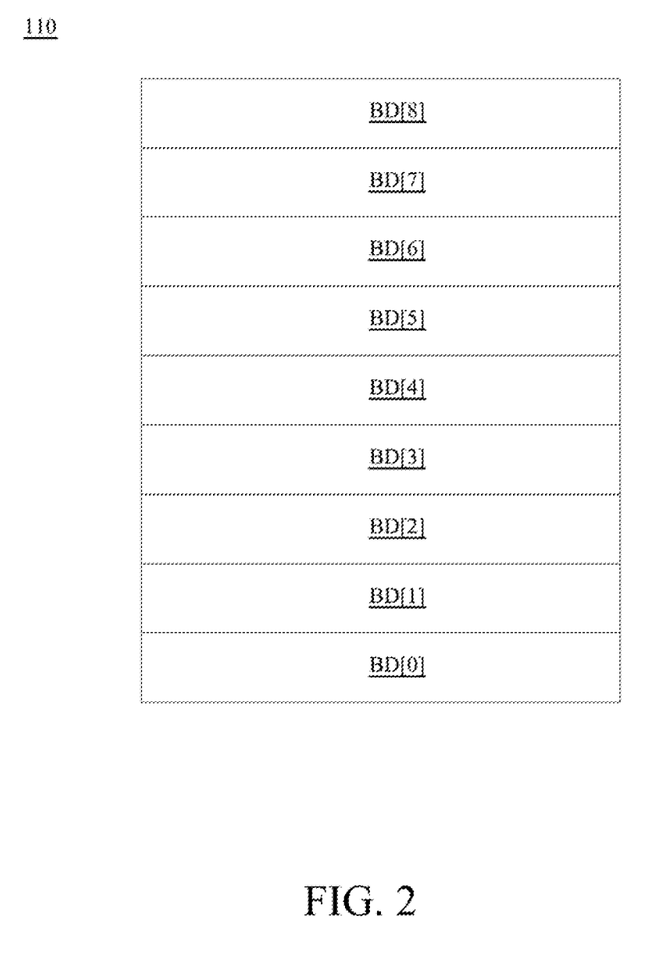
FIG. 2 depicts a schematic diagram of storage contents in the storage circuit in FIG. 1 according to some embodiments of the present disclosure.

A description is provided with reference to FIG. 2. FIG. 2 depicts a schematic diagram of storage contents in the storage circuit 110 in FIG. 1 according to some embodiments of the present disclosure. Take FIG. 2 for example, there are multiple boot data BD[0]-BD[8] stored in the storage circuit 110. The boot data BD[0]-BD[8] are the same to one another.

Figure 3:
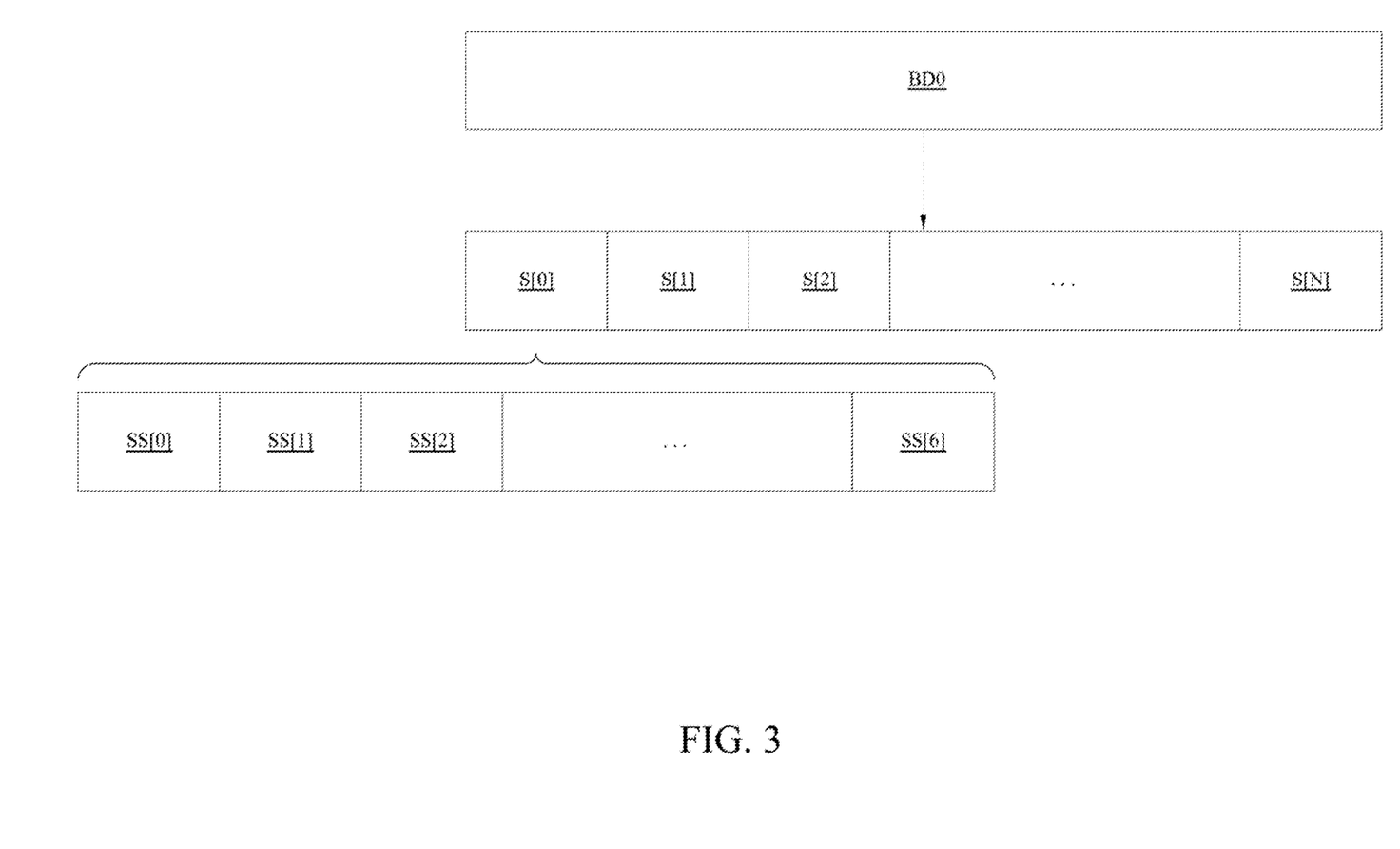
FIG. 3 depicts a schematic diagram of a data format of boot data according to some embodiments of the present disclosure.

A description is provided with reference to FIG. 3. FIG. 3 depicts a schematic diagram of a data format of the boot data BD[0] according to some embodiments of the present disclosure. Take FIG. 3 for example, the boot data BD[0] can be divided into plural segments S[0]-S[N] (there are several omissions in the figure, and the same method is also used to express the plural data segments when they are referred to in the following paragraphs). Each of the segments S[0]-S[N] can further be divided into plural sub-segments SS[0]-SS[6]. Since the other boot data BD[1]-BD[8] have the similar data format, a description in this regard is not repeated here.

Figure 4:
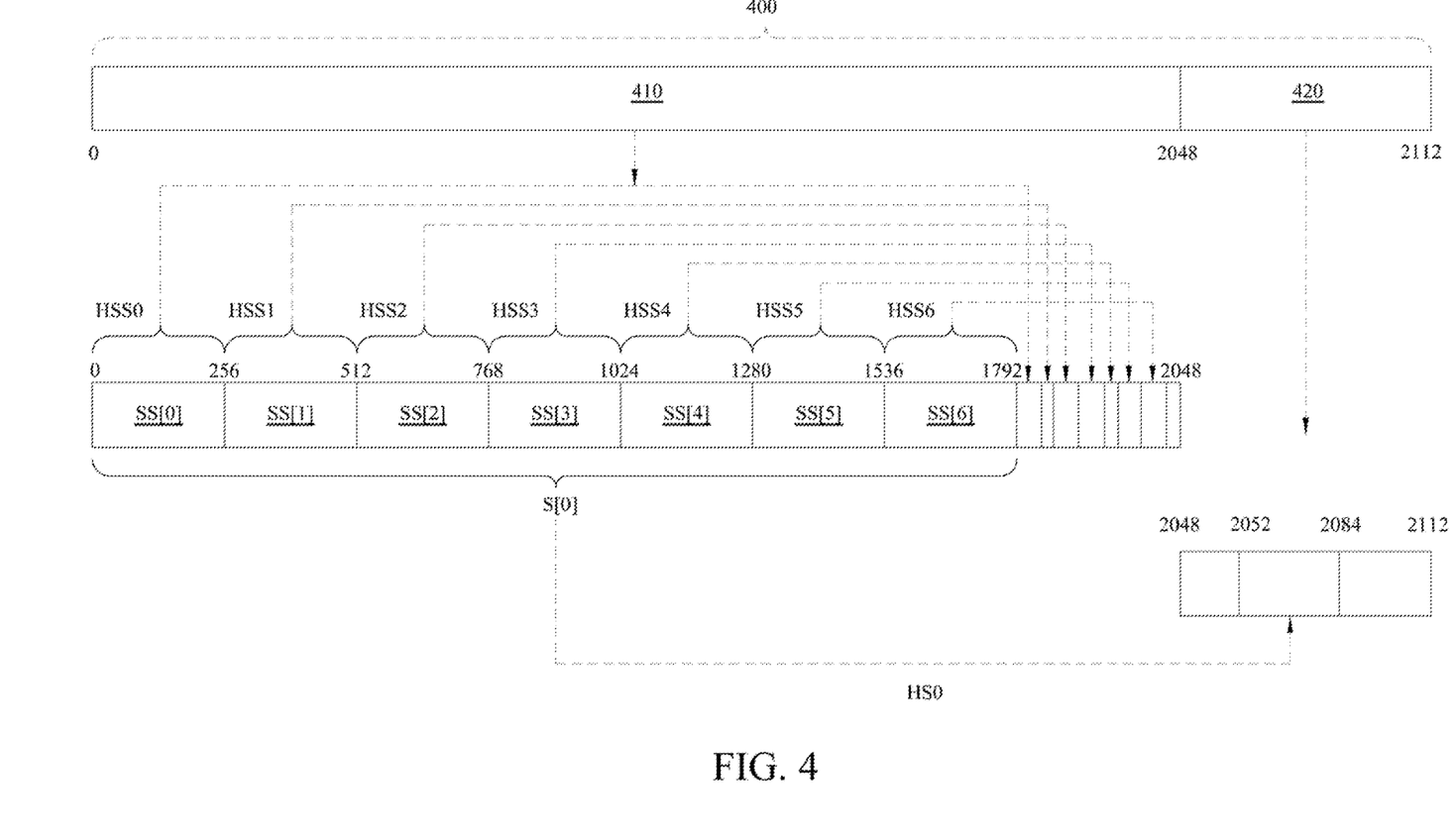
FIG. 4 depicts a schematic diagram of a data format of a storage unit according to some embodiments of the present disclosure.

A description is provided with reference to FIG. 4. FIG. 4 depicts a schematic diagram of a data format of storage unit 400 according to some embodiments of the present disclosure. Take the NAND flash memory for example, the storage unit 400 is a page. The storage unit 400 includes a data area 410 and an out-of-band (OOB) area 420. The data area 410 has 2048 bytes, and the out-of-band area 420 has 64 bytes.

Take FIG. 4 for example, the data area 410 is configured to store contents of the segment S[0] and the out-of-band area 420 is configured to store a hash value HS0 of the segment S[0]. In greater detail, the data area 410 can sequentially store contents of the sub-segments SS[0]-SS[6] of the segment S[0] and hash values HSS0-HSS6 of the sub-segments SS[0]-SS[6].

Figure 5:
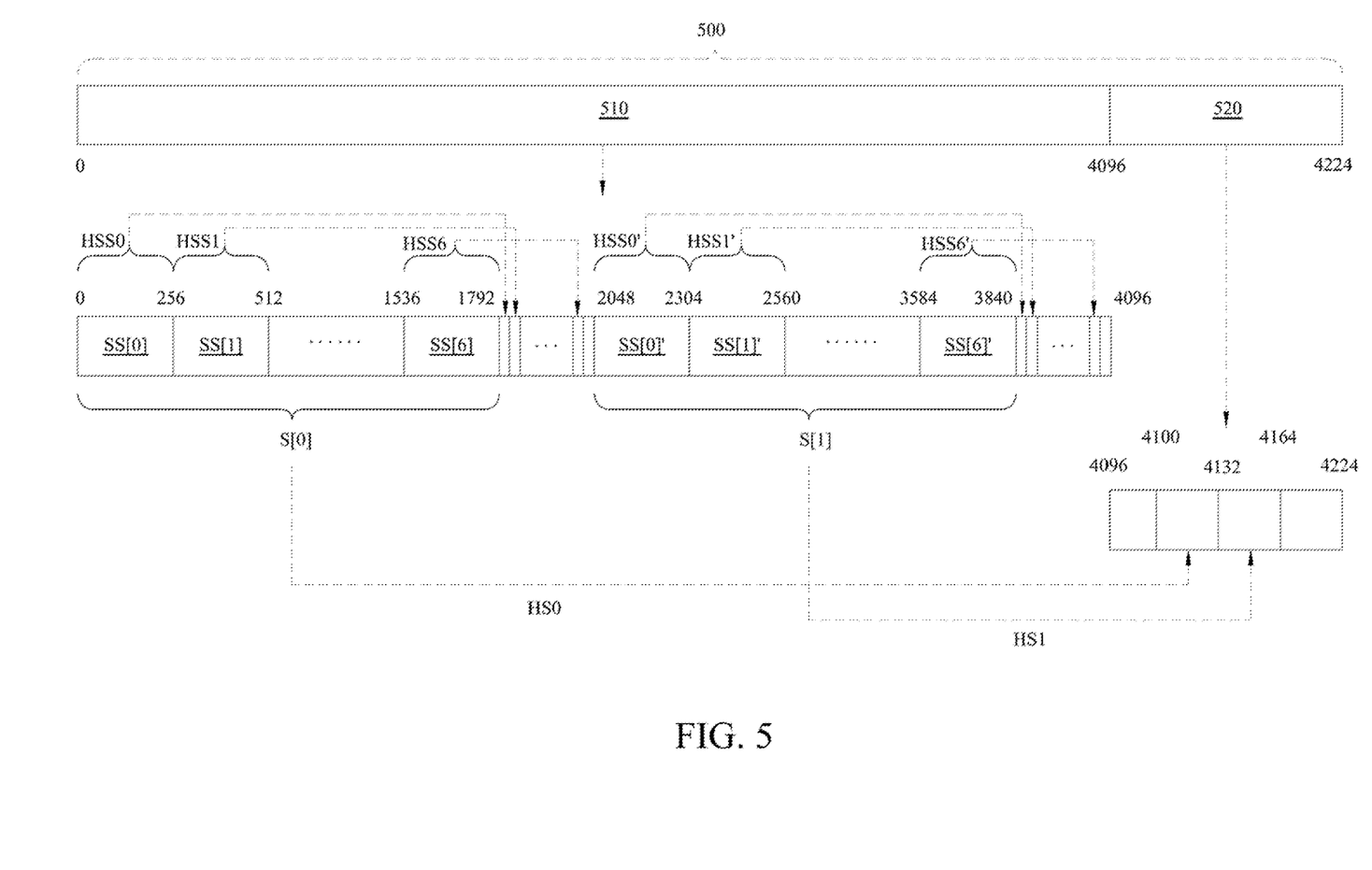
FIG. 5 depicts a schematic diagram of a data format of a storage unit according to some embodiments of the present disclosure.

A description is provided with reference to FIG. 5. FIG. 5 depicts a schematic diagram of a data format of storage unit 500 according to some embodiments of the present disclosure. Take the NAND flash memory for example, the storage unit 500 is a page. The storage unit 500 includes a data area 510 and an out-of-band area 520. The data area 510 has 4096 bytes, and the out-of-band area 520 has 128 bytes.

Take FIG. 5 for example, the data area 510 is configured to store the contents of the segment S[0] and contents of the segment S[1], and the out-of-band area 520 is configured to store the hash value HS0 of the segment S[0] and a hash value HS1 of the segment S[1]. In greater detail, the data area 510 can sequentially store the contents of the sub-segments SS[0]-SS[6] of the segment S[0], the hash values HSS0-HSS6 of the sub-segments SS[0]-SS[6], contents of sub-segments SS[0]'-SS[6]' of the segment S[1], and hash values HSS0'-HSS6' of the sub-segments SS[0]'-SS[6]'.

Figure 6:
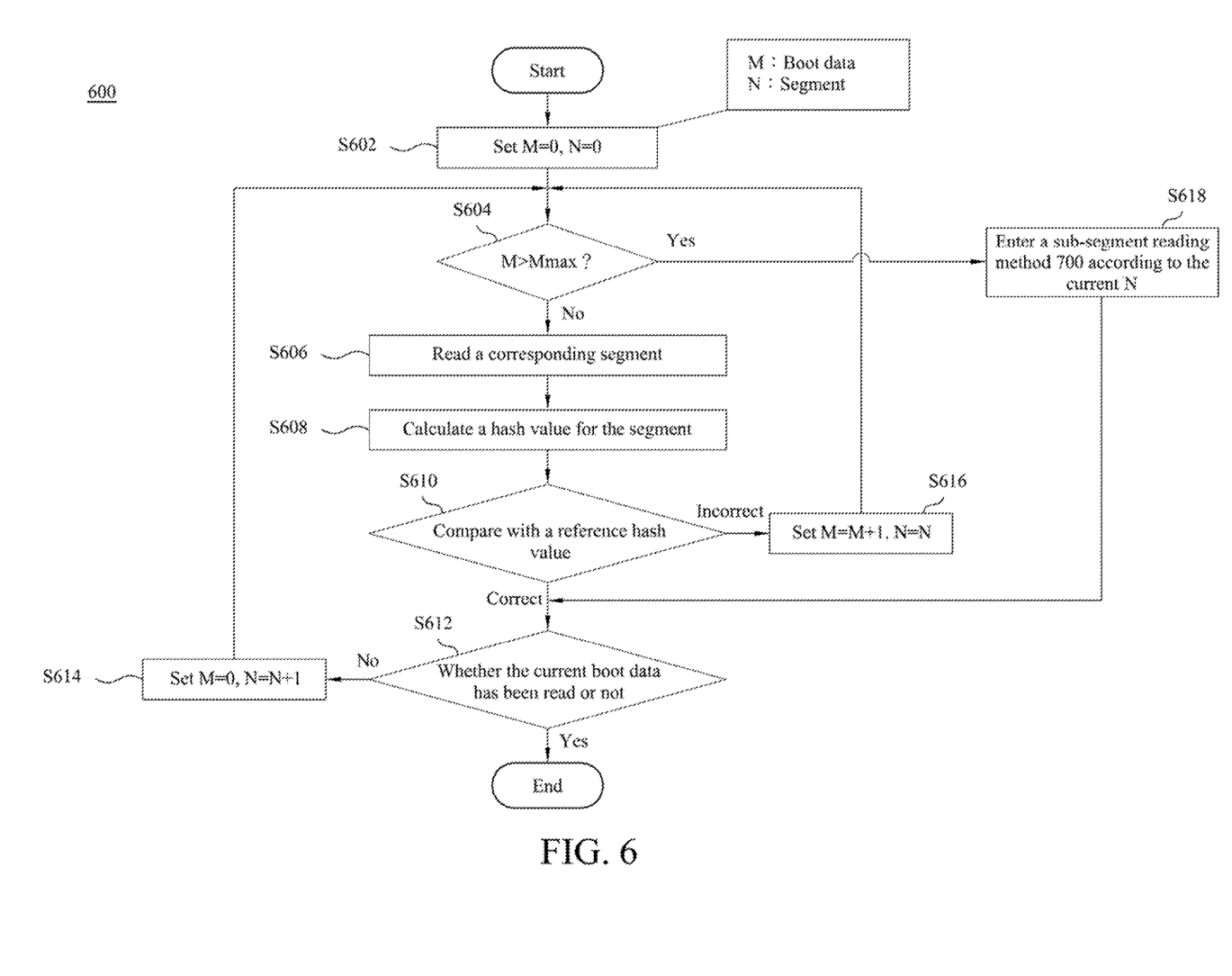
FIG. 6 depicts a flowchart of a segment reading method according to some embodiments of the present disclosure.

A description is provided with reference to FIG. 6. FIG. 6 depicts a flowchart of a segment reading method 600 according to some embodiments of the present disclosure. Take FIG. 6 for example, the segment reading method 600 includes operations S602, S604, S606, S608, S610, S612, S614, S616, and S618.

In order to facilitate understanding, the segment reading method 600 in FIG. 6 is described with reference to FIG. 2 to FIG. 4. However, the present disclosure is not limited in this regard.

In operation S602, the processor circuit 120 sets an index value M to zero and an index value N to zero, in which the index value M is an index value of the boot data BD[0]-BD[8] and the index value N is an index value of the segments S[0]-S[N]. For example, when the index value M is zero and the index value N is zero, it means that the processor circuit 120 will perform a relevant operation on the segment S[0] in the boot data BD[0].

In operation S604, the processor circuit 120 determines whether the index value M is greater than a maximum boot data index value Mmax or not. If the index value M is not greater than the maximum boot data index value Mmax, the process proceeds to operation S606. In the example of FIG. 2, since the storage circuit 110 stores the boot data BD[0]-BD[8], the maximum boot data index value Mmax is 8. Since at this time the index value M is zero (not greater than 8), the process proceeds to operation S606.

In operation S606, the processor circuit 120 reads a corresponding segment. Since at this time the index value M is zero and the index value N is zero, the processor circuit 120 reads the segment S[0] in the boot data BD[0].

In operation S608, the processor circuit 120 calculates a hash value for the segment read in operation S606. In greater detail, the processor circuit 120 calculates a hash value of the segment S[0].

In operation S610, the processor circuit 120 compares the hash value calculated in operation S608 with a reference hash value. In greater detail, the processor circuit 120 compares the hash value calculated in operation S608 with the hash value HS0 originally stored in the out-of-band area 420 to determine whether the read segment S[0] is correct or not. When a bit-flip problem does not occur in the segment S[0] of the boot data BD[0], the hash value calculated in operation S608 will be consistent with the hash value HS0 originally stored in the out-of-band area 420. That is to say, the segment S[0] read in operation S606 is correct (has correct contents). When the determination result of operation S610 is to be correct, the process proceeds to operation S612.

In operation S612, the processor circuit 120 determines whether the current boot data has been read or not. If it is determined that the current boot data has been read, the process ends. If it is determined that the current boot data has not been read, the process proceeds to operation S614. In greater detail, since the other segments S[2]-S[N] in the boot data BD[0] have not been read, the process proceeds to operation S614.

In operation S614, the processor circuit 120 sets the index value M to zero and increases the index value N by one. That is to say, since the segment S[0] in the boot data BD[0] has been determined to be correct, the processor circuit 120 performs the relevant operation on the segment S[1] in the boot data BD[0] (the index value M is zero and the index value N is 1). After that, the process proceeds to operation S604 and the subsequent operations again to read the segment S[1] in the boot data BD[0] and determine whether it is correct or not.

Return to operation S610. When the bit-flip problem occurs in the segment S[0] of the boot data BD[0], the hash value calculated in operation S608 will be inconsistent with the hash value HS0 originally stored in the out-of-band area 420. That is to say, the segment S[0] in the boot data BD[0] is determined to be incorrect (has incorrect contents). When the determination result of operation S610 is to be incorrect, the process proceeds to operation S616.

In operation S616, the processor circuit 120 increases the index value M by one and maintains the index value N. Since the segment S[0] of the boot data BD[0] is determined to be incorrect, the processor circuit 120 performs the relevant operation on the segment S[0] in the boot data BD[1] (the index value M is one and the index value N is zero). Thereafter, the process proceeds to operation S604 and the subsequent operations again to read the segment S[0] in the boot data BD[1] and determine whether it is correct or not.

When the segment S[0] in the boot data BD[1] is determined to be correct, the segment reading method 600 of FIG. 6 will proceed to operation S614 again. Then, the processor circuit 120 will perform the relevant operation on the segment S[1] in the boot data BD[0] (the index value M is zero and the index value N is one) to read the segment S[1] in the boot data BD[0] and determine whether it is correct or not.

However, when the segment S[1] in the boot data BD[0] is determined to be incorrect, the segment reading method 600 will proceed to operation S616 again. After that, the processor circuit 120 will perform the relevant operation on the segment S[1] in the boot data BD[1] (the index value M is one and the index value N is one) to read the segment S[1] in the boot data BD[1] and determine whether it is correct or not.

If the processor circuit 120 successfully reads the segments S[0]-S[N] with correct contents from the boot data BD[0]-BD[8] in sequence, the reading procedure of the segment reading method 600 ends. Thereafter, the processor circuit 120 can execute the boot procedure according to the read and correct segments S[0]-S[N] (corresponding to complete boot data).

Return to operation S604. However, if the index value M is greater than the maximum boot data index value Mmax (8 in the example of FIG. 2), the process proceeds to operation S618. That is to say, when a corresponding segment in each of the boot data BD[0]-BD[8] has incorrect contents (e.g., the segment S[0] in each of the boot data BD[0]-BD[8] is determined to be incorrect), the process proceeds to operation S618. In operation S618, the processor circuit 120 will enter a sub-segment reading method 700 in FIG. 7 according to the current index value N (e.g., the current index value N is zero).

Figure 7:
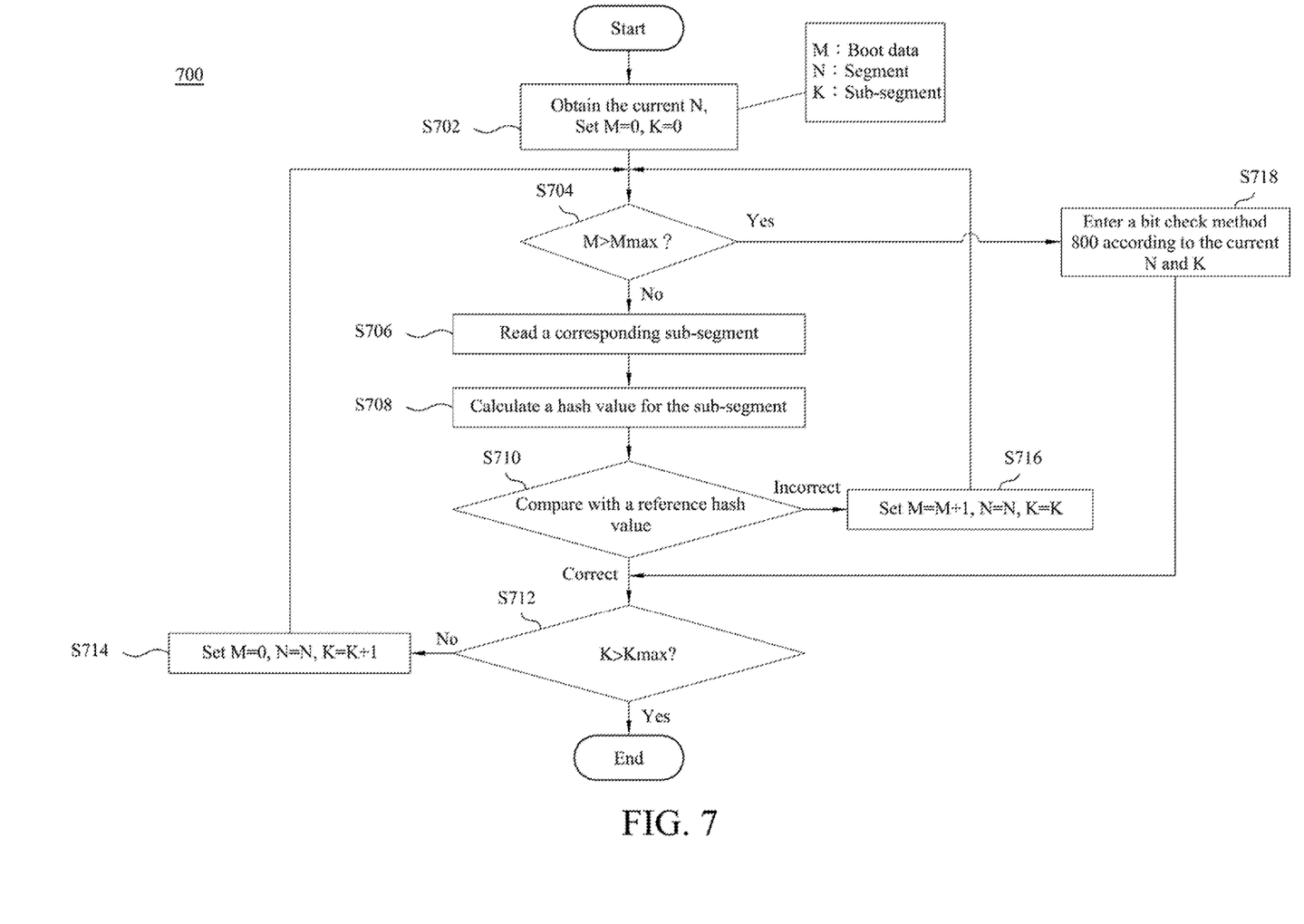
FIG. 7 depicts a flowchart of a sub-segment reading method according to some embodiments of the present disclosure.

A description is provided with reference to FIG. 7. FIG. 7 depicts a flowchart of the sub-segment reading method 700 according to some embodiments of the present disclosure. As mentioned above, if the segment S[0] in each of the boot data BD[0]-BD[8] is determined to be incorrect, the current index value N (which is zero) and the sub-segment reading method 700 can be utilized to read the correct data corresponding to the segment S[0].

Take FIG. 7 for example, the sub-segment reading method 700 includes operations S702, S704, S706, S708, S710, S712, S714, S716, and S718.

In order to facilitate understanding, the sub-segment reading method 700 in FIG. 7 is described with reference to FIG. 2 to FIG. 4. However, the present disclosure is not limited in this regard.

In operation S702, the processor circuit 120 obtains the current index value N in operation S618 (e.g., the current index value N is zero), and sets the index value M to zero and an index value K to zero, in which the index value K is an index value of the sub-segments SS[0]-SS[6]. For example, since the index value M is zero, the processor circuit 120 will perform the relevant operation on the sub-segment SS[0] of the segment S[0] in the boot data BD[0] when the current index value N is zero and the index value K is zero.

In operation S704, the processor circuit 120 determines whether the index value M is greater than the maximum boot data index value Mmax or not. If the index value M is not greater than the maximum boot data index value Mmax, the process proceeds to operation S706. In the above example, since at this time the index value M is zero (not greater than 8), the process proceeds to operation S706.

In operation S706, the processor circuit 120 reads a corresponding sub-segment. Since at this time the index value M is zero, the index value N is zero, and the index value K is zero, the processor circuit 120 reads the sub-segment SS[0] of the segment S[0] in the boot data BD[0].

In operation S708, the processor circuit 120 calculates a hash value for the sub-segment read in operation S706. In greater detail, the processor circuit 120 calculates the hash value of the sub-segment SS[0] of the segment S[0] in the boot data BD[0].

In operation S710, the processor circuit 120 compares the hash value calculated in operation S708 with a reference hash value. In greater detail, the processor circuit 120 compares the hash value calculated in operation S708 with the hash value HSS0 originally stored in the data area 410 to determine whether the read sub-segment SS[0] is correct or not. When a bit-flip problem does not occur in the sub-segment SS[0] of the segment S[0] in the boot data BD[0], the hash value calculated in operation S708 will be consistent with the hash value HSS0 originally stored in the data area 410. That is to say, the sub-segment SS[0] read in operation S706 is correct (has correct contents). When the determination result of operation S710 shows correctness, the process proceeds to operation S712.

In operation S712, the processor circuit 120 determines whether the index value K is greater than a maximum sub-segment index value Kmax or not. If the index value K is not greater than the maximum sub-segment index value Kmax, the process proceeds to operation S714. If the index value K is greater than the maximum sub-segment index value Kmax, the process ends. In the example of FIG. 2, since one segment includes the sub-segments SS[0]-SS[6], the maximum sub-segment index value Kmax is 6. Since at this time the index value K is zero (not greater than 6), the process proceeds to operation S714.

In operation S714, the processor circuit 120 sets the index value M to zero, maintains the index value N, and increases the index value K by one. That is to say, since the sub-segment SS[0] of the segment S[0] in the boot data BD[0] has been determined to have the incorrect contents, the processor circuit 120 performs the relevant operation on the sub-segment SS[1] of the segment S[0] in the boot data BD[0] (the index value M and the index value N are zero, the index value K is 1). Then, the process proceeds to operation S704 and the subsequent operations again to read the sub-segment SS[1] of the segment S[0] in the boot data BD[0] and determine whether it is correct or not.

Return to operation S710. When the bit-flip problem occurs in the sub-segment SS[0] of the segment S[0] in the boot data BD[0], the hash value calculated in operation S708 may be inconsistent with the hash value HSS0 originally stored in the data area 410. That is to say, the sub-segment SS[0] of the segment S[0] in the boot data BD[0] is determined to be incorrect. When the determination result of operation S710 shows incorrectness, the process proceeds to operation S716.

In operation S716, the processor circuit 120 increases the index value M by one and maintains the index value N and the index value K. Since the sub-segment SS[0] of the segment S[0] in the boot data BD[0] is determined to be incorrect, the processor circuit 120 performs the relevant operation on the sub-segment SS[0] of the segment S[0] in the boot data BD[1] (the index value M is one, the index value N and the index value K are zero). After that, the process proceeds to operation S704 and the subsequent operations again to read the sub-segment SS[0] of the segment S[0] in the boot data BD[1] and determine whether it is correct or not.

Since the rest of the related operations are similar to those of FIG. 6, a description in this regard is not repeated here.

If the processor circuit 120 successfully reads the correct sub-segments SS[0]-S[6] of the segment S[0] from the boot data BD[0]-BD[8] in sequence, it indicates that the correct segment S[0] has been read and the sub-segment reading method 700 ends.

Return to operation S704. However, if the index value M is greater than the maximum boot data index value Mmax (8 in the example of FIG. 2), the process proceeds to operation S718. That is to say, when a corresponding sub-segment in each of the boot data BD[0]-BD[8] is determined to be incorrect (e.g., the sub-segments SS[0] of the segments S[0] in all the boot data BD[0]-BD[8] are incorrect), the process proceeds to operation S718. In operation S718, the processor circuit 120 will enter a bit check method 800 in FIG. 8 according to the current index value N (e.g., the current index value N is zero) and the current index value K (e.g., the current index value K is zero).

Figure 8:
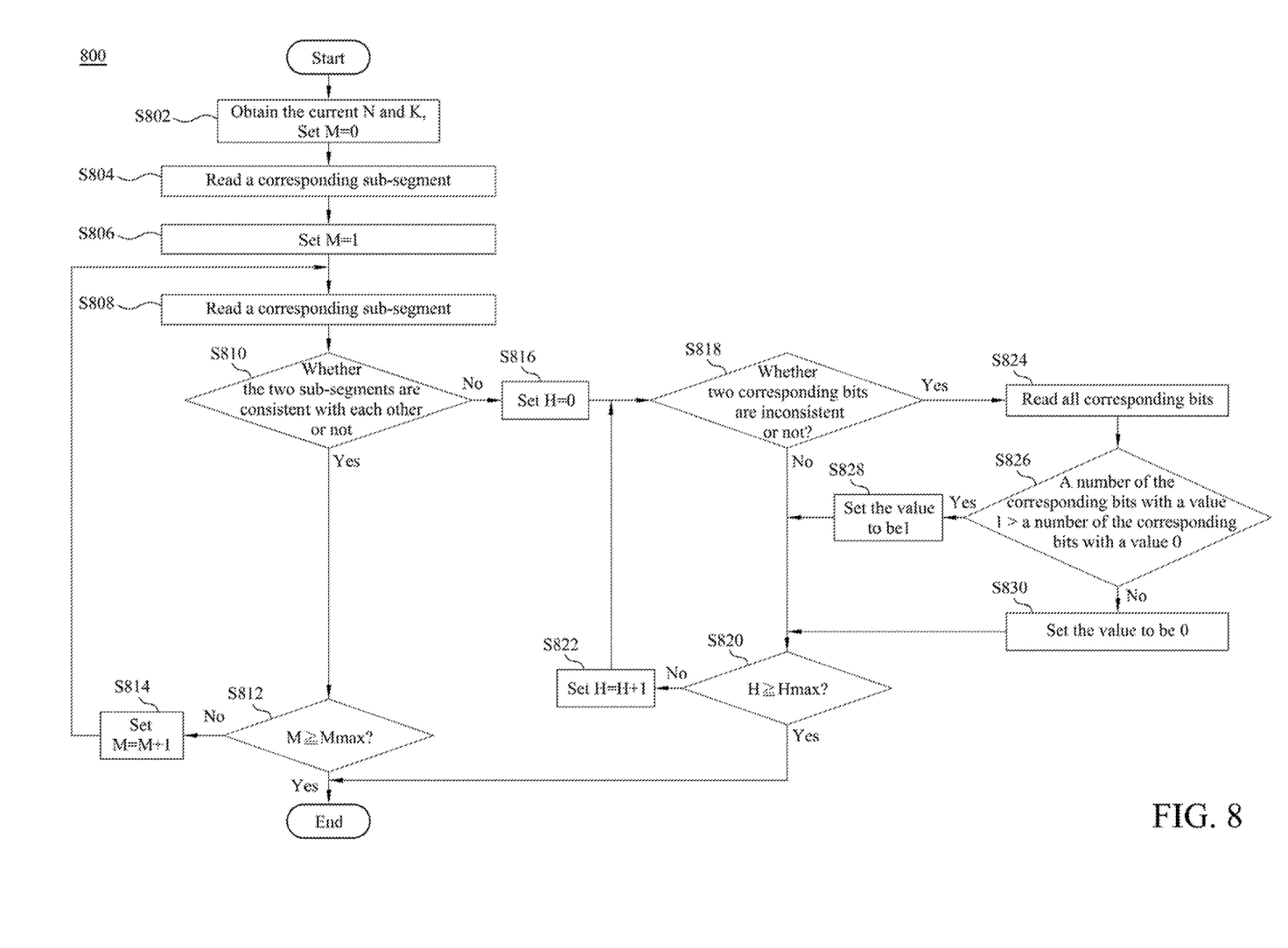
FIG. 8 depicts a flowchart of a bit check method according to some embodiments of the present disclosure.

A description is provided with reference to FIG. 8. FIG. 8 depicts a flowchart of the bit check method 800 according to some embodiments of the present disclosure. As mentioned above, if the sub-segments SS[0] of the segments S[0] in all the boot data BD[0]-BD[8] are determined to be incorrect, the current index value N (e.g., the current index value N is zero) and the current index value K (e.g., the current index value K is zero) and the bit check method 800 can be utilized to read the correct data corresponding to the sub-segment SS[0] of the segment S[0].

Take FIG. 8 for example, the bit check method 800 includes operations S802, S804, S806, S808, S810, S812, S814, S816, S818, S820, S822, S824, S826, S828, and S830.

In operation S802, the processor circuit 120 obtains the current index value N (e.g., the current index value N is zero) and the current index value K (e.g., the current index value K is zero) in operation S718, and sets the index value M to zero. For example, since the index value M is zero, the processor circuit 120 will perform the relevant operation on the sub-segment SS[0] of the segment S[0] in the boot data BD[0] when the current index value N is zero and the index value K is zero.

In operation S804, the processor circuit 120 reads a sub-segment correspondingly. That is to say, the processor circuit 120 reads the sub-segment SS[0] of the segment S[0] in the boot data BD[0].

In operation S806, the processor circuit 120 sets the index value M to one.

In operation S808, the processor circuit 120 reads a sub-segment correspondingly. That is to say, the processor circuit 120 reads the sub-segment SS[0] of the segment S[0] in the boot data BD[1].

In operation S810, the processor circuit 120 determines whether the two sub-segments are consistent with each other or not. In greater detail, the processor circuit 120 compares the two sub-segments read in operation S804 and operation S808, and determines whether the two are consistent with each other or not. If the two are consistent, the process proceeds to operation S812.

In operation S812, the processor circuit 120 determines whether the index value M is greater than or equal to the maximum boot data index value Mmax or not. If the index value M is not greater than or equal to the maximum boot data index value Mmax, the process proceeds to operation S814. If the index value M is greater than or equal to the maximum boot data index value Mmax, the process ends. In the above example, since at this time the index value M is equal to one (not greater than 8), the process proceeds to operation S814.

In operation S814, the processor circuit 120 increases the index value M by one (M is equal to 2). Thereafter, the process proceeds to operation S808 and the subsequent operations again to read the sub-segment SS[0] of the segment S[0] in the boot data BD[2] and determine whether it is consistent with the sub-segment SS[0] of segment S[0] in the boot data BD[0] read in operation S804 or not.

If the sub-segments SS[0] read by the processor circuit 120 from the boot data BD[0]-BD[8] are consistent, the bit check method 800 ends and the processor circuit 120 has read the correct sub-segment SS[0].

Return to operation S810. However, if the two sub-segments read in operation S804 and operation S808 are not consistent with each other, the process proceeds to operation S816.

In operation S816, The processor circuit 120 sets an index value H to zero. The index value H corresponds to one of bits of the sub-segment. For example, when the index value H is 0, it corresponds to a first bit of the sub-segment. When the index value H is 2047, it corresponds to a 2048th bit of the sub-segment.

In operation S818, the processor circuit 120 determines whether two corresponding bit values are inconsistent or not. If the two corresponding bit values are consistent (that is, there is no inconsistency), the process proceeds to operation S820. In greater detail, the processor circuit 120 determines whether a corresponding bit of the sub-segment SS[0] of the segment S[0] in the boot data BD[0] and a corresponding bit of the sub-segment SS[0] of the segment S[0] in the boot data BD[1] are inconsistent with each other or not. If the two are consistent, the process proceeds to operation S820.

In operation S820, the processor circuit 120 determines whether the index value H is greater than or equal to a maximum bit index value Hmax or not. In the example of FIG. 4, since each of the sub-segments includes 256 bytes and each of the bytes includes 8 bits, each of the sub-segments includes 2048 bits. Accordingly, the maximum bit index value Hmax is 2047. If the current index value H is not greater than or equal to the maximum bit index value Hmax (that is, the current index value H is less than the maximum bit index value Hmax), the process proceeds to operation S822. If the current index value H is greater than or equal to the maximum bit index value Hmax, the process ends.

In operation S822, the processor circuit 120 increases the index value H by one. In greater detail, the processor circuit 120 checks on the next bit.

Return to operation S818. When the corresponding bit of the sub-segment SS[0] of the segment S[0] in the boot data BD[0] is inconsistent with the corresponding bit of the sub-segment SS[0] of the segment S[0] in the boot data BD[1], the process proceeds to operation S824.

In operation S824, the processor circuit 120 reads all corresponding bits. In greater detail, the processor circuit 120 reads all the corresponding bits in the boot data BD[0]-BD[8].

In operation S826, the processor circuit 120 determines whether or not a number of the corresponding bits with a value 1 (e.g., logic value 1) is greater than a number of the corresponding bits with a value 0 (e.g., logic value 0) in the corresponding bits that are read. If the number of the corresponding bits with the value 1 is greater than the number of the corresponding bits with the value 0, the process proceeds to operation S828 to determine a value of the corresponding bit of the sub-segment SS[0] to be 1. Conversely, if the number of the corresponding bits with the value 1 is not greater than the number of the corresponding bits with the value 0, the process proceeds to operation S830 to determine the value of the corresponding bit of the sub-segment SS[0] to be 0.

The bit check method 800 can check all bits in an error sub-segment to determine what the correct data of the error sub-segment are. The sub-segment reading method 700 can check all sub-segments in an error segment to determine what the correct data of all the sub-segments of the error segment are. The segment reading method 600 can determine what the correct data of one set of the boot data are according to the segments of the boot data.

In some related technologies, a processor circuit with an error-correcting code (ECC) function is adopted to read the boot data and perform error correction on it. However, this kind of processor circuit has a larger area and a higher cost. In some related technologies, program codes with the ECC function implemented by software are utilized to read the boot data and perform error correction on it. However, this kind of program codes usually occupies a large memory space. In some related technologies, a storage circuit with the ECC function is adopted and performs error correction on the boot data. However, this kind of storage circuit has a higher price.

As compared with the above related technologies, the processor circuit 120 in the present disclosure can read the correct boot data so that the subsequent boot procedure can be successfully executed. In addition, the present disclosure has the advantages of smaller area, lower cost, and no need to occupy a large memory space.

It is noted that the numbers of the boot data BD[0]-BD[8] and the sub-segments SS[0]-SS[6] mentioned previously are only examples, and various suitable numbers are within the scope of the present disclosure.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A boot data reading system comprising:
 a storage circuit configured to store first boot data and second boot data, wherein the first boot data comprises a first segment and a second segment, the second boot data comprises a third segment and a fourth segment, wherein the storage circuit further stores a first stored hash value of the first segment, a second stored hash value of the second segment, a third stored hash value of the third segment, and a fourth stored hash value of the fourth segment; and
 a processor circuit coupled to the storage circuit, wherein the processor circuit sets a first index value and a second index value to be 0, reads the storage circuit to access the first segment when the first index value is not greater than a maximum boot data index value, calculates a first calculated hash value of the first segment, and compares the first calculated hash value with the first stored hash value to determine whether the first segment is correct or not,
 wherein when the first segment is correct, the processor circuit sets the first index value to be 0 and sets the second index value to be 1, reads the storage circuit to access the second segment, calculates a second calculated hash value of the second segment, and compares the second calculated hash value with the second stored hash value to determine whether the second segment is correct or not,
 wherein when the first segment and the second segment are correct, the processor circuit executes a boot procedure according to the first segment and the second segment,
 wherein when the first segment is incorrect, the processor circuit sets the first index value to be 1 and sets the second index value to be 0, reads the storage circuit to access the third segment when the first index value is not greater than the maximum boot data index value, calculates a third calculated hash value of the third segment, and compares the third calculated hash value with the third stored hash value to determine whether the third segment is correct or not,
 wherein when the first segment is incorrect but the third segment is correct, the processor circuit sets the first index value to be 0 and sets the second index value to be 1, reads the storage circuit to access the second segment and determines whether the second segment is correct or not,
 wherein when the third segment and the second segment are correct, the processor circuit executes the boot procedure according to the third segment and the second segment,
 wherein when the third segment is correct and the second segment is incorrect, the processor circuit sets the first index value to be 1 and sets the second index value to be 1, reads the storage circuit to access the fourth segment, calculates a fourth calculated hash value of the fourth segment, and compares the fourth calculated hash value with the fourth stored hash value to determine whether the fourth segment is correct or not,
 wherein when the third segment and the fourth segment are correct, the processor circuit executes the boot procedure according to the third segment and the fourth segment.

2. The boot data reading system of claim 1, wherein when the second segment is correct, a reading procedure ends.

3. The boot data reading system of claim 1, wherein when the fourth segment is correct, a reading procedure ends.

4. The boot data reading system of claim 3, wherein the storage circuit is further configured to store third boot data, the third boot data comprises a fifth segment, and the fifth segment corresponds to the first segment,
 wherein when both of the first segment and the third segment are incorrect, the processor circuit reads the fifth segment and determines whether the fifth segment is correct or not,
 wherein when the first segment, the third segment, and the fifth segment are all incorrect, the processor circuit enters a sub-segment reading procedure.

5. The boot data reading system of claim 4, wherein the first segment comprises a first sub-segment and a second sub-segment, the third segment comprises a third sub-segment, the fifth segment comprises a fourth sub-segment, and the third sub-segment and the fourth sub-segment correspond to the first sub-segment,
 wherein the processor circuit reads the first sub-segment and determines whether the first sub-segment is correct or not, wherein when the first sub-segment is correct, the processor circuit reads the second sub-segment and determines whether the second sub-segment is correct or not, wherein when the first sub-segment is incorrect, the processor circuit reads the third sub-segment and determines whether the third sub-segment is correct or not, wherein when both the first sub-segment and the third sub-segment are incorrect, the processor circuit reads the fourth sub-segment and determines whether the fourth sub-segment is correct or not.

6. The boot data reading system of claim 5, wherein when the first sub-segment, the third sub-segment, and the fourth sub-segment are all incorrect, the processor circuit enters a bit check procedure.

7. The boot data reading system of claim 6, wherein the processor circuit determines a correct value of a corresponding bit according to a plurality of corresponding bit values of the first sub-segment, the third sub-segment, and the fourth segment.

8. The boot data reading system of claim 7, wherein when a first number of bits with a first logic value in the corresponding bit values is greater than a second number of bits with a second logic value in the corresponding bit values, the processor circuit determines that the correct value is the first logic value.

9. The boot data reading system of claim 1, wherein the storage circuit is a NAND flash memory.

10. A boot data reading method comprising:
setting, by a processor circuit, a first index value and a second index value to be 0;
reading, by the processor circuit, a storage circuit to access a first segment of first boot data when the first index value is not greater than a maximum boot data index value, wherein the storage circuit stores a first stored hash value of the first segment, a second stored hash value of a second segment, a third stored hash value of a third segment, and a fourth stored hash value of a fourth segment;
calculating, by the processor circuit, a first calculated hash value of the first segment;
comparing, by the processor circuit, the first calculated hash value with the first stored hash value to determine whether the first segment is correct or not;
setting, by the processor circuit, the first index value to be 0 and setting the second index value to be 1 when the first segment is correct;
reading, by the processor circuit, the storage circuit to access the second segment of the first boot data, calculating a second calculated hash value of the second segment, and comparing the second calculated hash value with the second stored hash value to determine whether the second segment is correct or not;
executing, by the processor circuit, a boot procedure according to the first segment and the second segment when the first segment and the second segment are correct;
setting, by the processor circuit, the first index value to be 1 and setting the second index value to be 0 when the first segment is incorrect;
reading, by the processor circuit, the storage circuit to access the third segment of second boot data when the first index value is not greater than the maximum boot data index value, calculating a third calculated hash value of the third segment, and comparing the third calculated hash value with the third stored hash value to determine whether the third segment is correct or not;
setting, by the processor circuit, the first index value to be 0 and setting the second index value to be 1 when the first segment is incorrect but the third segment is correct;
reading, by the processor circuit, the storage circuit to access the second segment and determining whether the second segment is correct or not;
executing, by the processor circuit, the boot procedure according to the third segment and the second segment when the third segment and the second segment are correct;
setting, by the processor circuit, the first index value to be 1 and setting the second index value to be 1 when the third segment is correct and the second segment is incorrect, reading the storage circuit to access the fourth segment of the second boot data, calculating a fourth calculated hash value of the fourth segment, and comparing the fourth calculated hash value with the fourth stored hash value to determine whether the fourth segment is correct or not; and
executing, by the processor circuit, the boot procedure according to the third segment and the fourth segment when the third segment and the fourth segment are correct.

11. The boot data reading method of claim 10, wherein third boot data comprises a fifth segment, and the fifth segment corresponds to the first segment, wherein the boot data reading method further comprises:
reading, by the processor circuit, the fifth segment and determining whether the fifth segment is correct or not when both of the first segment and the third segment are incorrect; and
entering a sub-segment reading procedure when the first segment, the third segment, and the fifth segment are all incorrect.

12. The boot data reading method of claim 11, wherein the first segment comprises a first sub-segment and a second sub-segment, the third segment comprises a third sub-segment, the fifth segment comprises a fourth sub-segment, and the third sub-segment and the fourth sub-segment correspond to the first sub-segment, wherein the boot data reading method further comprises:
reading, by the processor circuit, the first sub-segment and determining whether the first sub-segment is correct or not;
reading, by the processor circuit, the second sub-segment and determining whether the second sub-segment is correct or not when the first sub-segment is correct;
reading, by the processor circuit, the third sub-segment and determining whether the third sub-segment is correct or not when the first sub-segment is incorrect; and
reading, by the processor circuit, the fourth sub-segment and determining whether the fourth sub-segment is correct or not when both of the first sub-segment and the third sub-segment are incorrect.

13. The boot data reading method of claim 12, further comprising:
entering, by the processor circuit, a bit check procedure when the first sub-segment, the third sub-segment, and the fourth sub-segment are all incorrect.

14. The boot data reading method of claim 13, further comprising:
determining, by the processor circuit, a correct value of a corresponding bit according to a plurality of corresponding bit values of the first sub-segment, the third sub-segment, and the fourth segment.

15. The boot data reading method of claim 14, wherein when a first number of bits with a first logic value in the corresponding bit values is greater than a second number of bits with a second logic value in the corresponding bit values, the processor circuit determines that the correct value is the first logic value.

16. A processor circuit coupled to a storage circuit, wherein the storage circuit is configured to store first boot data and second boot data, the first boot data comprises a first segment and a second segment, the second boot data comprises a third segment and a fourth segment, wherein the storage circuit further stores a first stored hash value of the first segment, a second stored hash value of the second segment, a third stored hash value of the third segment, and a fourth stored hash value of the fourth segment, wherein the processor circuit is configured to:

set a first index value and a second index value to be 0;

read the storage circuit to access the first segment when the first index value is not greater than a maximum boot data index value;

calculate a first calculated hash value of the first segment;

compare the first calculated hash value with the first stored hash value to determine whether the first segment is correct or not;

set the first index value to be 0 and set the second index value to be 1 when the first segment is correct;

read the storage circuit to access the second segment, calculate a second calculated hash value of the second segment, and compare the second calculated hash value with the second stored hash value to determine whether the second segment is correct or not;

execute a boot procedure according to the first segment and the second segment when the first segment and the second segment are correct;

set the first index value to be 1 and set the second index value to be 0 when the first segment is incorrect;

read the storage circuit to access the third segment when the first index value is not greater than the maximum boot data index value, calculate a third calculated hash value of the third segment, and compare the third calculated hash value with the third stored hash value to determine whether the third segment is correct or not;

set the first index value to be 0 and set the second index value to be 1 when the first segment is incorrect but the third segment is correct;

read the storage circuit to access the second segment and determine whether the second segment is correct or not;

execute the boot procedure according to the third segment and the second segment when the third segment and the second segment are correct;

set the first index value to be 1 and set the second index value to be 1 when the third segment is correct and the second segment is incorrect, read the storage circuit to access the fourth segment, calculate a fourth calculated hash value of the fourth segment, and compare the fourth calculated hash value with the fourth stored hash value to determine whether the fourth segment is correct or not; and execute the boot procedure according to the third segment and the fourth segment when the third segment and the fourth segment are correct.

* * * * *